(139.)
CHARLES MICKLE.
Improvement in Propulsion of Vessels.
No. 122,046. Patented Dec. 19, 1871.
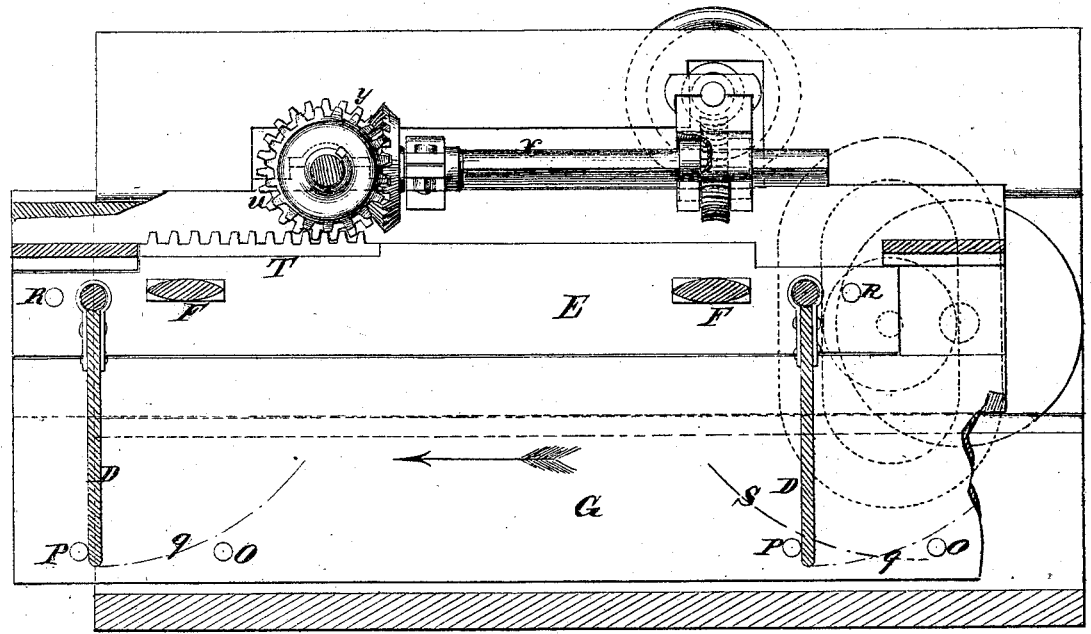
Fig. 1.
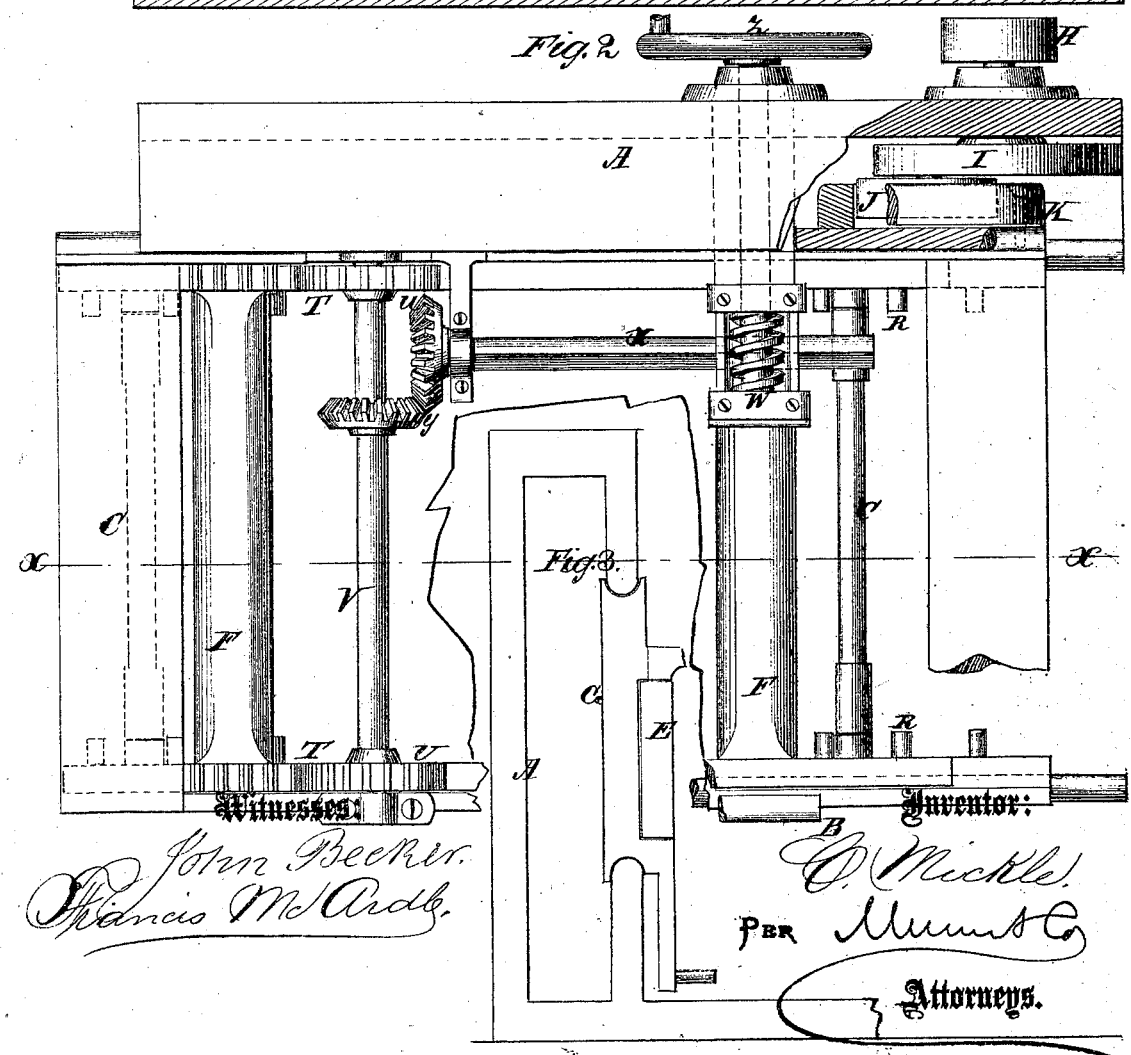
Fig. 2.
Fig. 3.
Witnesses:
John Becker.
Francis McArdle.
Inventor:
C. Mickle.
Per Munn & Co.
Attorneys.

CHARLES MICKLE.
Improvement in Propulsion of Vessels.
No. 122,046. Patented Dec. 19, 1871.
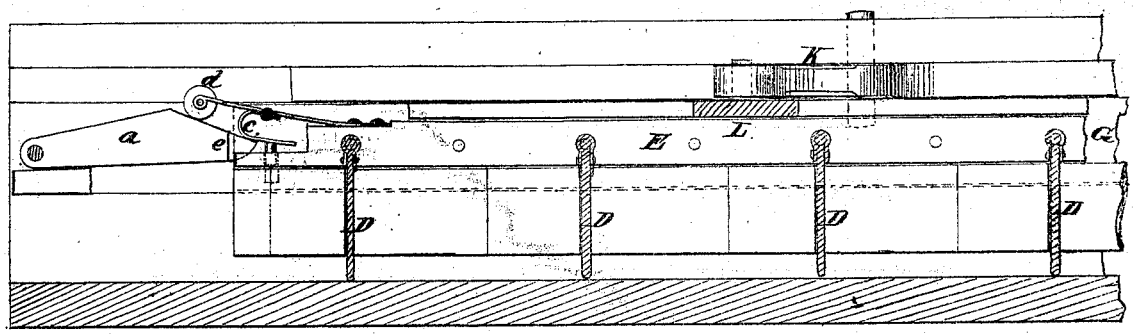
Fig. 4.
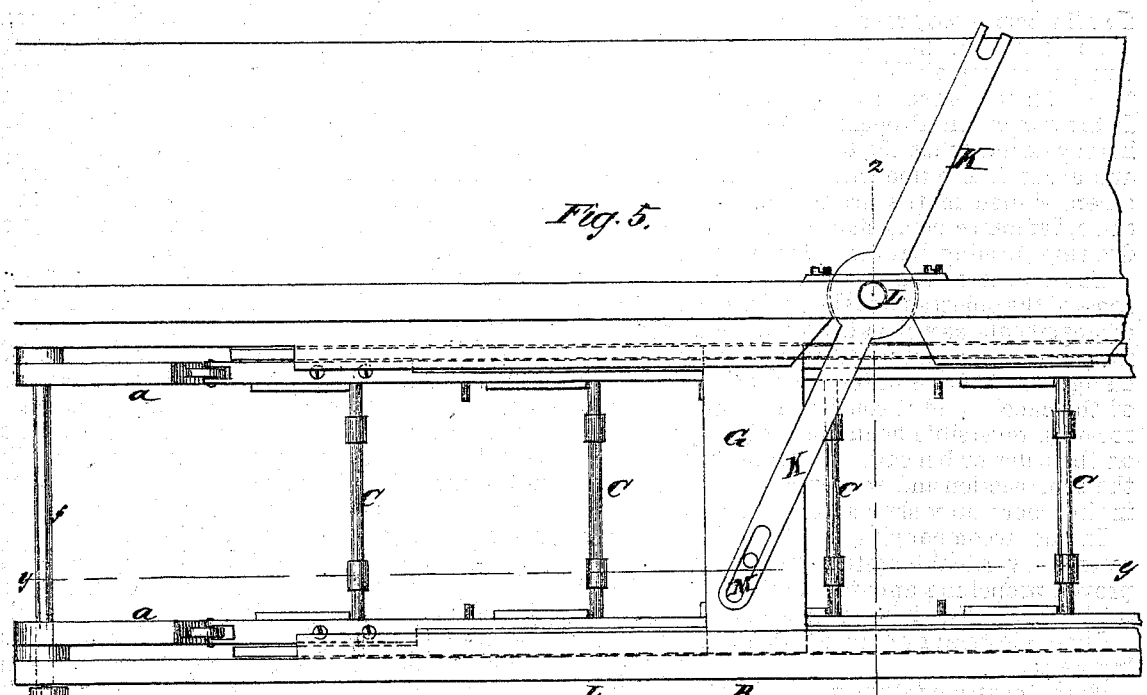
Fig. 5.
Fig. 6.
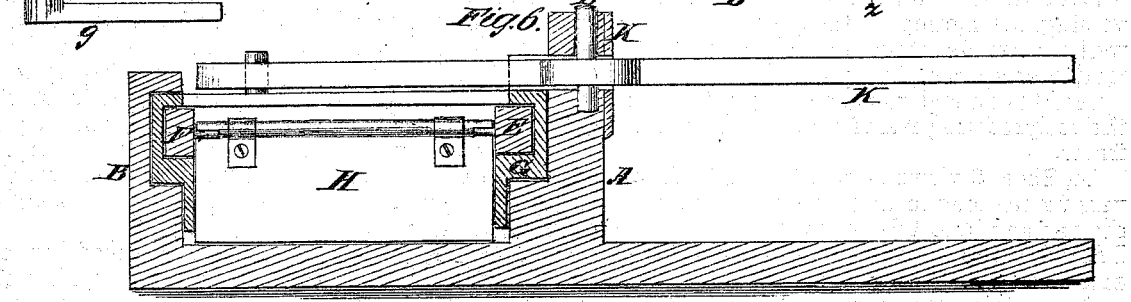
Fig. 7.

UNITED STATES PATENT OFFICE.

CHARLES MICKLE, OF GUELPH, CANADA.

IMPROVEMENT IN PROPULSION OF VESSELS.

Specification forming part of Letters Patent No. 122,046, dated December 19, 1871.

*To all whom it may concern:*

Be it known that I, CHARLES MICKLE, of Guelph, county of Wellington, province of Ontario, Canada, have invented a new and useful Improvement in Propelling Vessels; and I do hereby declare that the following is a full, clear, and exact description thereof, which will enable others skilled in the art to make and use the same, reference being had to the accompanying drawing forming part of this specification.

The object of this invention is to overcome some of the objections to the ordinary side-wheels of steamboats, as well as to provide efficient means for propelling canal-boats without creating such an agitation of the water as to wash the banks of the canal; and it consists in applying reciprocating reversible floats for that purpose either on the sides or beneath the stern, bow, or keel, the construction and arrangement being as hereinafter more fully shown and described.

In the accompanying drawing, Figure 1 represents a vertical longitudinal section of my improved propelling apparatus taken on the line $x$ $x$ of Fig. 2. Fig. 2 is a top or plan view.

Similar letters of reference indicate corresponding parts.

Both these views show an apparatus for reversing the motion of the propelling-floats, as well as a mode of giving them a reciprocating motion or applying the power.

Fig. 3 is an end view showing the position of the reciprocating frame and the movable float-frame.

On Sheet 2 views of modifications for both reversing the motion and applying the power are shown; and here I desire to distinctly state that I do not confine myself to any particular mechanism for either applying the power to the floats or for reversing the motion, as I am aware that either may be done in various ways—one way in each case being shown in the modification referred to.

In Figs. 4 and 5 the two modifications are combined, the former being a vertical longitudinal section of Fig. 5 taken on the line $y$ $y$, and the latter (Fig. 5) being a plan view. Fig. 6 is a vertical cross-section of Fig. 5 taken on the line $z$ $z$. Fig. 7 is a detail, showing the action of the modified reversing device on the floats.

As seen on Sheet 1, the apparatus is represented as attached to the side of a boat.

A is the boat. B is the outer wall of what may be termed the "float-house," answering for the "wheel-house" of the common steamboat, which may be supported from the side of the boat in any suitable manner. C represents the transverse base across this float-house, to which the floats are hung, and from which they are made to swing in either direction. D represents the floats, more or less in number of which may be used. The bars C are connected at the end to a movable frame, E, composed of two side pieces connected together by the transverse pieces F. The frame E is carried by the sliding or reciprocating-frame G, to which the power is applied. The frame G carrying the float-frame E is given a reciprocating horizontal motion by means of steam or other motive power within the boat or vessel. In this example of my invention the power is applied by means of a belt on the pulley H. This pulley H is on a shaft which passes through the side of the boat in a stuffing-box. On the outer end of the shaft is a disk-wheel, I, carrying a wheel, J, which revolves on a pin in the disk I. On the side of the reciprocating frame G is a plate, K, having a vertical recess therein, in which the wheel J works. The recess is in width equal to the diameter of the wheel J. The wheel J is pivoted at one side of the center of the disk-wheel I, so that it works in the recess, and consequently throws as it is carried round, by the disk I, the frame G and the float-frame E a distance in each direction equal to the throw of the eccentric. As the eccentric wheel J revolves on its own axis in the recess the friction caused by this movement is not so great as to be an objection.

In Figs. 4 and 5, Sheet 2, the reciprocating motion is given by means of a simple lever, K, working on the fulcrum-pivot L through the boat, and by means of the slot M in its end, on the pin N of the reciprocating frame.

Referring again to Sheet 1, O P are stop-pins in the lower part of the reciprocating frame G. The floats are changed in position in relation to these stop-pins by the operation of the reversing gear which moves the frame E on the reciprocating frame G in either direction, as the case may be. Supposing the vessel to be moving in the direction indicated by the arrow, Fig. 1, the frame G will be moving with the floats in the opposite direction, the floats will be in a vertical position and bearing against the stop-pins P. When the back movement of the frame G takes place the water will force the floats upward, as indicated by the line $q$, and over the pins O. The floats will be stopped in their upward movement during the back stroke before they reach a horizontal position. Pins R may act for this purpose, or any other device suitable for the purpose may be employed. As soon as the float begins to move in the opposite direction the inclined position allows the water to start it, and it will be carried down to the pins P again for another propelling stroke. The change in the direction of the boat is produced by sliding the frame E a distance equal to that from P to O or thereabout. This is done without stopping the motion of the floats, and the pins O then become the stops, and the edges of the floats will pass over the pins P on the line S. The action of the float is the same as before described. The reversing in this instance, or as shown in the drawing, is accomplished by racks T on the frame E and pinions U on the shaft V, the shaft V being revolved by means of the screw W operating in a worm-gear wheel, through which the square shaft X passes, and the pair of bevel-wheels $y$, as seen in the drawing. The screw W is revolved by means of the band-wheel Z on the inside of the boat. When the action of the floats is changed the frame E retains its position on the reciprocating frame G until the reversing gear is again put in operation. The reversing may be accomplished in various ways. On Sheet 2 stops $a$ are provided on each end of the reciprocating frame, with which stops the frame E comes in contact, when they are turned down at one end of the stroke, as seen in the drawing. The ends of the frame E are provided with springs $c$ and friction-rolls $d$, the latter of which runs up to the stops and the end of the frame strikes a shoulder, $e$, on the stop. While the floats are propelling, these stops are turned up out of the way, being attached to the cross-shafts $f$, and having their position indicated by the lever $g$ on the end of the shaft.

In applying my improvement to a canal-boat the floats may be made to work through a well-hole in the bottom of the boat, and the arrangement may be such that the floats may be raised and lowered, or adjusted, according to the depth of water or draft of the boat. The floats are, of course, intended to be submerged, and it is believed that they will work without producing such an agitation on the surface of the water as will wash the banks of a canal or be in any way objectionable. The floats may probably be made to work at the stern of a canal-boat to the best advantage, either through a well-hole or beneath the bottom.

I do not limit myself to any particular location or application to the boat. The floats may be made to operate noiselessly and, it is believed, most effectually for propelling canal-boats as well as other marine vessels.

Having thus described my invention, I claim as new and desire to secure by Letters Patent—

1. The combination of the frames E and G, arranged substantially as described, and for the purposes set forth.

2. The combination of the floats D with the frames E and G, substantially as and for the purpose described.

3. The reversing gear, consisting of the racks T, pinions U, wheels $y$, screws W, worm V', and sliding-shaft X, arranged to operate on the frame E substantially as and for the purposes described.

4. The frame E, in combination with a reversing apparatus, and with reciprocating floats D, substantially as and for the purpose described.

CHAS. MICKLE.

Witnesses:
ALEX. F. ROBERTS.
FRANK BLOCKLEY.

(139)